United States Patent [19]

Karaki

[11] Patent Number: 4,503,458
[45] Date of Patent: Mar. 5, 1985

[54] COLOR HARDCOPY APPARATUS

[75] Inventor: Kouichi Karaki, Tokyo, Japan

[73] Assignee: Olympus Optical Co., Ltd., Tokyo, Japan

[21] Appl. No.: 421,920

[22] Filed: Sep. 23, 1982

[30] Foreign Application Priority Data

Sep. 25, 1981 [JP] Japan .................. 56-151617

[51] Int. Cl.³ .............................. H04N 1/46
[52] U.S. Cl. ........................... 358/75; 358/78
[58] Field of Search .................. 358/75–80; 346/21, 46

[56] References Cited

U.S. PATENT DOCUMENTS 4,117,497  9/1978  McGroody ................... 346/21

Primary Examiner—Michael A. Masinick
Attorney, Agent, or Firm—Toren, McGeady and Stanger

[57] ABSTRACT

In the disclosed color printer, a copy film is moved into contact with the surface of color inks in a color ink vessel having sets of three primary color ink cells arranged in two dimensions at pitches corresponding to color signals. A peforating device perforates the copy film at positions corresponding to color signals and representing the original picture. An arrangement supplies a sheet of copy paper over the copy film to copy the original picture through the perforations formed in the copy film.

11 Claims, 8 Drawing Figures

COLOR HARDCOPY APPARATUS

BACKGROUND OF THE INVENTION

1. Field of the Invention

This invention relates to color copiers, and particularly to wet color hardcopy apparatuses to produce color hard copies using blue, green, and red color signals.

2. Description of the Prior Art

Variouss types of color copiers for making color hard copies have recently been developed.

A typical color hardcopy process operates on a principal similar to color photography and involves the injection of inks in three primary colors, blue, green, and red (B, G, and R). However, all these processes require large, complex, and expensive apparatuses so that they are economically disadvantageous.

To eliminate these disadvantages, a simpler process was invented which uses a three-layer paper composed of a base layer 1, an ink layer 2, and an opaque layer surface 3 as shown in FIG. 1. The ink layer 2 contains ink materials (color matter) in three primary colors, blue, green and red, arrayed in stripes. A needle 4 perforates the surface layer 3 of the paper according to color signals and causes the color inks to ooze out of the surface layer 3 in order to provide a color picture on the paper.

This process suffers from a number of disadvantages. It requires a special type of paper having a three-layer structure, whhich is so expensive, thick, and heavy as to be economically unsuitable for mass consumption and inconvenient in handling. Furthermore, the ink layer of the paper and the perforations formed in the surface layer 3 still remain after completion of copying and may cause blurring of the ink under accidental finger pressure. This would degrade the quality of the cover copy. Also, the production of the number of copies from an original picture requires the entry of color signals for every copy. This requires a long time and imposes a load on the electric circuit.

SUMMARY OF THE INVENTION

An object of the present invention is to eliminate the above-described defects of the conventional color hardcopy apparatuses.

Another object of the present invention is to provide a color hardcopy apparatus which can produce color copies of good quality in an economical way of using ordinary papers instead of special papers.

Another object of the present invention is to provide a color hardcopy apparatus which has a relatively simple construction to produce many color copies from the same original picture with ease and efficiency.

Another object of the present invention is to provide a color hardcopy apparatus to be capable of forming perforations corresponding to color signals in a copy film with accuracy.

According to the present invention, the color hardcopy apparatus comprises a color ink vessel in which plural sets of three primary color (B, G and R) ink cells are arranged in 2 dimensions and at the pitch corresponding to that of color signals, means to feed a copy film in close contact with the surface of color inks in the color ink cells, means placed above and in face of the color ink vessel to make perforations, corresponding to the color signals and representing an original picture, in the copy film, and means to supply a sheet of copy paper over the copy film and to copy the original picture on the copy paper through the perforations formed in the said copy film.

The color ink vessel may be constructed, for example, in the form of a plate or drum.

Each of the ink cells color ink vessel is designed in such a way that it is always fed with ink from the corresponding color ink tank.

The means to perforate the said copy film may comprise a pin with a conical tip, which is driven up and down according to color signals to make perforations corresponding to the intensities of the color signals.

In addition, the means to perforate the copy film may employ a heater for the pin, or use a laser beam or electric discharges instead of the pin.

DESCRIPTION OF THE PREFERRED EMBODIMENTS

Figure 1:
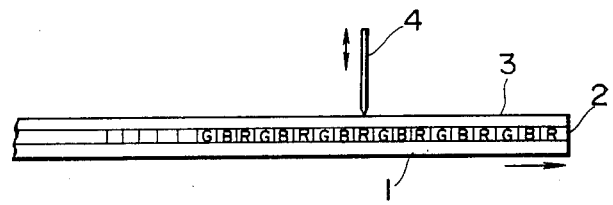
FIG. 1 is a schematic view showing an example of conventional color hardcopy apparatuses.
Figure 2:
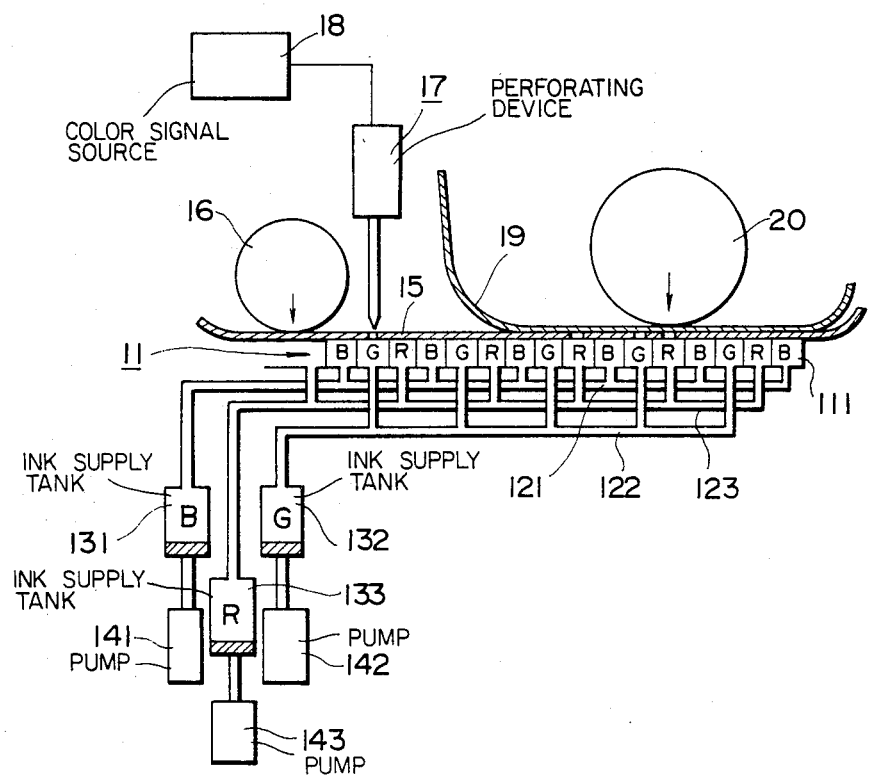
FIG. 2 is a schematic view showing a preferred embodiment of the present invention.
Figure 3:
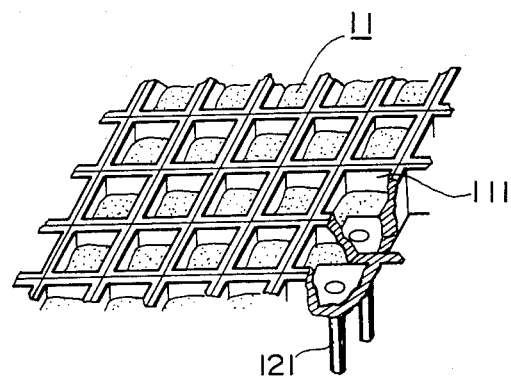
FIG. 3 is an enlarged prespective showing the color ink vessel used in the preferred embodiment of the present invention as shown in FIG. 2.

In FIG. 2, a color ink vessel 11 is constructed in the form of a plate by plural sets of three small primary color ink cells 111 (B, G and R) arranged along 2 dimensions and at a pitch corresponding to that of color signals as shown in FIG. 3.

Each of the said ink cells 111 is opened at the top part, and yet constructed that there will be no ink oozing during the non-operating conditions. Each group of B, G or R color ink cells 111 communicates with a corresponding pipe 121, 122 or 123, which is in turn connected to the corresponding B, G or R color ink tank 131, 132 or 133. The ink supply tanks 131, 132 and 133 are equipped with the pumps 141, 142 and 143 to continuously feed the color ink cells 111 with B, G and R color inks respectively.

A copy film 15 is fed along over the color ink vessel 11. The said film is as thin as a sheet of paper. A roller 16 feeds the film 15 along over the color ink vessel 11 on pressing the said film 15 in close contact with the surface of color inks in the said ink cells 111. In this case, it is understood that any other means than the roller 16 may be used to feed the copy film 15.

Figure 4:
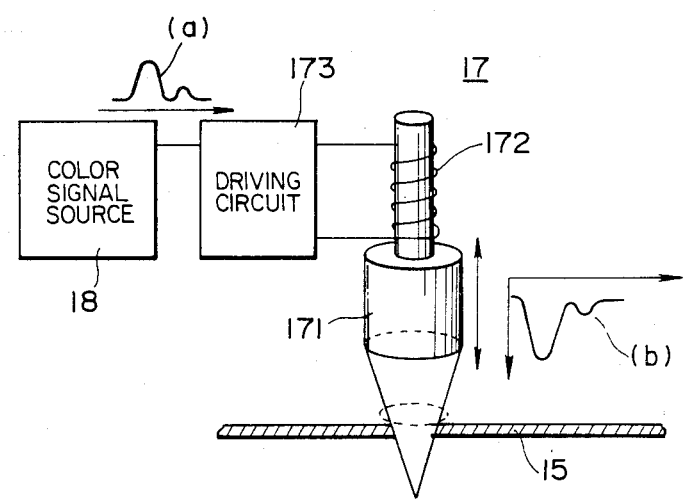
FIG. 4 is a schematic view showing an example of the perforating means used in the preferred embodiment of the present invention as shown in FIG. 2.

A perforating means or device 17 is placed above and in face of the color ink vessel 11. With color signals from a color signal source 18, for example, a VTR, the perforating device 17 provides perforations in the said copy film 15 over the color ink cells 111 corresponding to the color signals. The perforating device as shown in FIG. 4 by way of example comprises a pin 171 with a central tip, a coil 172 (for example, a voice coil) to drive the pin 171 up and down, and a driving circuit 173 for the coil 172. The pin 171 is driven over the coil by a vertical stroke corresponding to a color signal from the color signal source 18 to perforate the film 15. The greater the amplitude or intensity of the color signal, the greater is the drop of the pin 171 and thus the larger is the perforation formed by the pin 171.

The embodiment of the present invention as shown in FIG. 2 is also provided with a means to feed a copy paper 19 over the upper surface of the copy film 15. A roller 20 feeds the copy paper 19 over the film 15 on pressing the paper 19 on the surface of the said film 15. It is understood that any means other than the roller 20 may be used to feed the said copy paper 19.

The operation of the color hardcopy apparatus according to the present invention will be described below.

The roller 16 at first feeds the copy film 15 over the color ink vessel 11 on pressing the film 15 on the surface of color inks in the said vessel 11. Then, the said copy film 15 comes in close contact with the surface of the said color inks in the said ink cells 111 by the aid of the ink viscosity.

As shown in FIG. 4, when a color signal (a) is then transmitted from the color signal source 18, the driving circuit 173 drives the coil 172 with the said color signal (a) and the driven coil 172 moves the pin vertically as shown by curve (b) over a stroke corresponding to the color signal (a). Thus, the pin 171 forms a perforation, having a size corresponding to the amplitude or intensity of the said color signal (a), in the copy film 15 over an ink cell 111 corresponding to the color signal (a), and the color ink in the ink cell 111 oozes out on the copy film 15.

Similarly, another color signal from the color signal source 18 drives the pin 171 to form another perforation corresponding to the amplitude of intensity of the said color signal in the said film 15 over another ink cell 111 for the color corresponding to the said color signal.

Similar operations are performed for the subsequent color signals until the desired original color copy picture is translated to a formation of perforations in the film 15.

After the desired original picture has been translated in the film 15, the roller 20 feeds and presses the copy paper 19 over the surface of the film 15. Then, the color inks in the ink vessel 11 ooze out of the ink cells 111 onto the upper surface of the film 15 through the perforations formed therein and stick on the copy paper 19 under the pressure of the roller 20. Thus, a color copy is produced on the copy paper 19 by the transfer of the original picture through the representing perforation in the said film 15.

Plural sheets of color copy can be produced from the same original picture by supplying the same number of copy papers one by one over the perforated copy film 15 and applying the pressure of the roller 20 onto the copy papers sequentially. All the while, the ink cells 111 in the color ink vessel 11 are fed with 3 primary color inks from the corresponding tanks 131, 132 and 133. Therefore, clear color copies can be produced in quantities as required.

According to the present invention, it is understood that any type of ordinary paper can be used for copying since an original picture for color copy is translated in a formation of perforations on the copy film and transferred onto the copy paper. The availability of ordinary papers results in a low cost of paper and a convenience in handling, compared with the conventional use of special three-layer papers. A copy picture transferred on a paper through the copy film 15 causes no ink blurring after drying so that it maintains its good quality for a much longer time than the conventional color copies which might cause ink blurrs under a finger pressure applied to the copied papers. Besides, the color hardcopy apparatus according to the present invention is capable of producing any desired number of copies from the same original picture only by supplying the same number of copy papers one by one over the copy film, with more ease and for a much shorter time of production than the conventional apparatuses which required applying color signals for every color copy to produce plural copies from an original picture. To enter the same set of color signals repeatedly in the apparatus, every conventional color hardcopy technique required a frame memory to store the set of color signals translated from an original picture.

According to the present invention, however, the color hardcopy apparatus can eliminate the necessity of the frame memory, because it requires no further supply of color signals from the said color signal source, once a formation of perforations representing an original picture is provided in the said copy film. In short, the apparatus is simplified in construction and economically advantageous.

Figure 5:
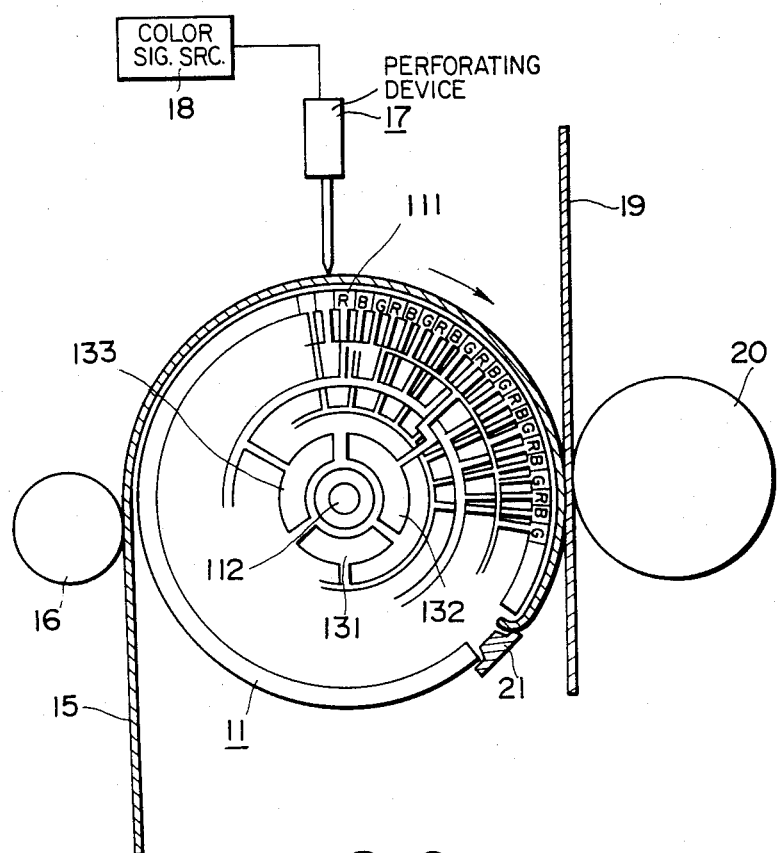
FIG. 5 is a schematic view showing another preferred embodiment of the present invention having a color ink vessel in the form of a drum.

FIG. 5 shows another preferred embodiment of the present invention. In this embodiment, the color ink vessel 11 is constructed in the form of a drum. The drum 11 contains plural sets of three primary color ink cells 111 (B, G and R) arranged in the periphery as well as 3 color (B, G and R) ink tanks 131, 132 and 133 and a rotary drum shaft 112 in the center part. The end of the copy film 15 is fixed by a fastener 21 in the cylindrical ink layer formed by said color ink cells 111. The perforating means 17, driven by color signals from the color signal source 18, forms perforations corresponding to the color signals in the copy film 15, as the drum 11 is rotated by the rotary shaft 112. The other part of this construction is similar to the corresponding part of the construction as shown in FIG. 2. Therefore, the description of that part is omitted herein to avoid the duplication.

In this embodiment of the present invention, the perforating means 17 perforates the film 15 which is moving together with the color ink vessel 11 turning in the direction of the arrow mark shown in FIG. 5. Consequently, a formation of perforations representing an original color picture is produced in the film 15 with efficiency. Once the said original color picture is translated in a formation of perforations in the film 15, a number of copies can be produced at a higher speed and with higher efficiency merely by feeding copy papers one by one by means of the roller 20 on turning the color ink drum vessel 11.

In addition, the present invention is not limited to the above-described embodiments, but can be modified within the scope of the claims.

Figure 6:
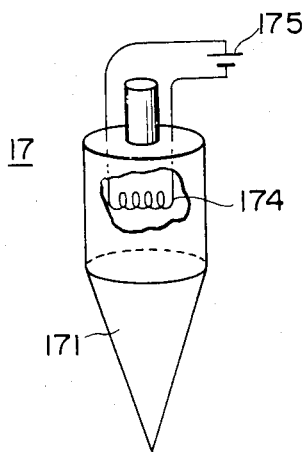
FIG. 6 is a schematic view showing a pin device with a self-contained heater according to the present invention.

In the above-described embodiments of the present invention, the perforating means employs a pin with a conical tip, which is pushed by a mechanical force into the said copy film to perforate it. However, the pin may not always provide an accurate perforation corresponding to the drop of the said pin. To assure an improved accuracy of perforation, a heater 174, as shown in FIG. 6 for example, may be placed in the pin 171 and connected to a power supply 175 for the purpose of heating the said pin 171. If the film 15 is made of synthetic resin relatively weak to the heat, the pin 171 with a heater 174 therein can make an accurate perforation corresponding to the drop of the pin 171.

Figure 7:
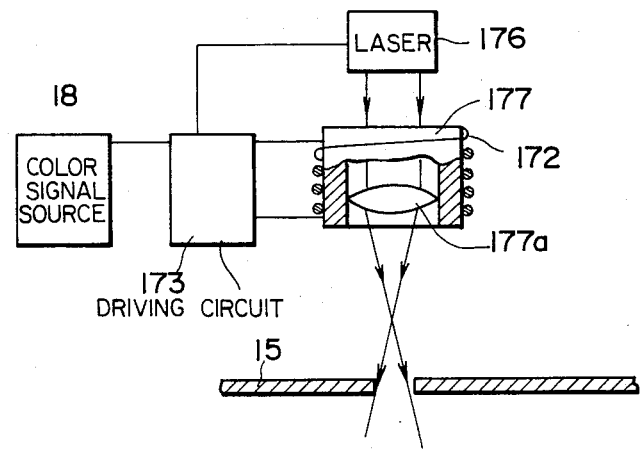
FIG. 7 is an illustrative view showing a perforating means using a laser beam according to the present invention.

The perforating means 17 may use a laser beam instead of the pin 171, as it is shown in FIG. 7. The perforating means using a laser beam may be composed of a laser source 176, a lens holder 177 supporting a condensing lens 177a, a coil 172 (for example, voice coil) to drive the said lens holder 177 vertically, that is, in the direction of the optical axis of the said lens 177a, and a driving circuit 173 of the said coil 172, as it is shown in FIG. 7. In this perforating means 17, a color signal coming from the color signal source 18 turns on the laser source 176 through the said driving circuit 173, which at the same time drives the said coil 172 to move the said lens holder 177 and the said lens 177a in the direction of the optical axis. Consequently, a laser beam is radiated on the upper surface of the said copy film 15 to provide a perforation having a diameter corresponding to the intensity of the color signal and defined by the laser spot on the surface of the said film 15. In this case, the ON-OFF switching of the said laser source 18 may be provided by a shutter.

The perforating means 17, which works the copy film 15 out of contact therewith, produces substantially no damage nor stain to the film 15 in normal operation, compared with the above-described perforating means which applies a mechanical force to the film 15. So it can be expected that the said perforating means 17 assure a good quality of produced color copies.

Figure 8:
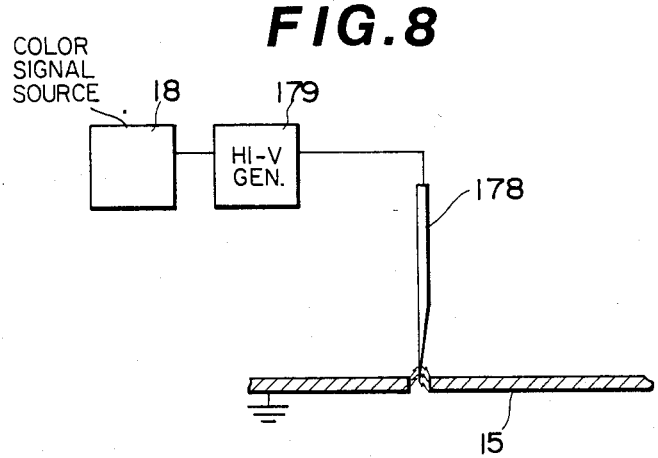
FIG. 8 is an illustrative view showing a perforating means using electric discharges according to the present invention.

The above-described perforating means 17 may also use electric discharges instead of the pin 171, as shown in FIG. 8. The perforating means using electric discharges may comprise an electric discharge pin 178 and a high-voltage generator circuit 179. In the perforating means 17, the high-voltage generator circuit 179 produces a high voltage corresponding to a color signal from the said color signal source 18 and applies it to the electric discharge pin 178, which perforates the said copy film 15 with the sparks discharged toward a paired earthing electrode (i.e. grounding electrode, not shown) through the said film 15. If the said film 15 itself is conductive, it may be connected to the earth, or otherwise the said color ink vessel 11 may be grounded.

What is claimed is:

1. A color apparatus comprising a color ink vessel in which plural sets of three primary color ink cells are arranged along two dimensions and at a pitch corresponding to that of color signals and cells being arranged to hold color inks and having upper surfaces, means to feed a copy film in close contact with the surfaces of said color ink cells, means placed above and facing said color ink cells to make perforations corresponding to the color signals and representing an original picture in the copy film, and means to supply a sheet of copy paper over the copy film and to copy the original picture on the copy paper through the perforations formed in the copy film.

2. A color hardcopy apparatus as claimed in claim 1, in which said color ink vessel is constructed in the form of a plate.

3. A color hardcopy apparatus as claimed in claim 1, in which said color ink vessel is constructed in the form of a drum.

4. A color hardcopy apparatus as claimed in any one of claims 1 to 3, in which said color ink vessel is equipped with means, including a plurality of tanks, to feed each of said color ink cells in said color ink vessel always with the corresponding color ink from a corresponding color ink tank.

5. A color hardcopy apparatus as claimed in any one of claims 1 to 3, in which said perforating means comprises a pin having a conical tip and means to drive said pin up and down according to the color signals to make perforations corresponding to the intensities of the color signals in the copy film.

6. A color hardcopy apparatus as claimed in claim 5, in which said perforating means comprises a heater for the said pin.

7. A color hardcopy apparatus as claimed in any one of claims 1 to 3, in which said perforating means comprises a laser source, a condensing lens, and a control means to move said lens in the direction of the optical axis thereof according to each of the color signals and to radiate a laser beam on the surface of the copy film for a laser spot corresponding to the intensity of the color signal.

8. A color hardcopy apparatus as claimed in any of claims 1 to 3, in which said perforating means comprises an electric discharge pin and a high-voltage generator to produce a high voltage corresponding to each of the color signals.

9. An apparatus as in claim 4, wherein said perforating means comprises a pin having a conical tip and means to drive said pin up and down according to the color signals to make perforations corresponding to the intensities of the color signals in the copy film.

10. An apparatus as in claim 4, wherein said perforating means comprises a laser source, a condensing lens, and a control means to move said lens in the direction of the optical axis thereof according to each of the color signals and to radiate a laser beam on the surface of the copy film for a laser spot corresponding to the intensity of the color signal.

11. An apparatus as in claim 4, wherein said perforating means comprises an electric discharge pin and a high-voltage generator to produce a high voltage corresponding to each of the color signals.

* * * * *